(12) United States Patent
Bornhoevd et al.

(10) Patent No.: US 7,403,954 B2
(45) Date of Patent: Jul. 22, 2008

(54) SYSTEMS AND METHODS FOR REPEATABLE DATABASE PERFORMANCE TESTING

(75) Inventors: Christof Bornhoevd, San Francisco, CA (US); Pablo E. Guerrero, Palo Alto, CA (US)

(73) Assignee: SAP AG, Walldorf (DE)

( * ) Notice: Subject to any disclaimer, the term of this patent is extended or adjusted under 35 U.S.C. 154(b) by 0 days.

(21) Appl. No.: 11/241,317

(22) Filed: Sep. 30, 2005

(65) Prior Publication Data
US 2007/0078825 A1    Apr. 5, 2007

(51) Int. Cl.
G06F 17/00    (2006.01)

(52) U.S. Cl. .................. 707/102; 707/100; 707/101

(58) Field of Classification Search .............. 707/1, 707/2, 3; 709/220; 702/179
See application file for complete search history.

(56) References Cited

U.S. PATENT DOCUMENTS

| | | | |
|---|---|---|---|
| 5,701,471 A | 12/1997 | Subramanyam | |
| 5,819,066 A | 10/1998 | Bromberg et al. | |
| 6,249,886 B1 * | 6/2001 | Kalkunte | 714/47 |
| 6,708,137 B2 * | 3/2004 | Carley | 702/179 |
| 6,718,322 B1 * | 4/2004 | Brye | 707/3 |
| 6,801,903 B2 * | 10/2004 | Brown et al. | 707/2 |
| 7,069,177 B2 * | 6/2006 | Carley | 702/179 |
| 7,246,159 B2 * | 7/2007 | Aggarwal et al. | 709/220 |

FOREIGN PATENT DOCUMENTS

WO    WO 2005/116871 A1    12/2005

OTHER PUBLICATIONS

Dietrich et al, "A Practitioner's Introduction to Database Performance Benchmarks and Measurements", Computer Journal, Aug. 1, 1992, pp. 322-331, vol. 35, No. 4.
Yu et al, "On Worksheet Characterization of Relational Database Environments", IEEE Transactions on Software Engineering, Apr. 1, 1992, pp. 347-355, vol. 18, No. 4.
Yao et al, "Analysis of Database System Architectures Using Benchmarks", IEEE Transactions on Software Engineering, Jun. 1987, pp. 709-724, vol. SE-13, No. 6.

* cited by examiner

*Primary Examiner*—Sana Al-Hashemi
(74) *Attorney, Agent, or Firm*—Chad R. Walsh; Fountainhead Law Group PC (57) ABSTRACT

Embodiments of the present invention improve database performance testing. In one embodiment, the present invention includes a method of testing the performance of an application running transactions against a database comprising specifying performance critical database transaction statements in the application corresponding to one or more tables and separately executing each performance critical database transaction statement against the database a predetermined number of times, wherein the database is in a predetermined initial state at the beginning of each execution.

13 Claims, 10 Drawing Sheets

| Experiment Name | |
|---|---|
| Tech Description | INSERT / SELECT / UPDATE / DELETE |
| | Operation: | Table/s Involved: |
| Date | Month / Day / Year |
| Textual Description | Textual Description |
| Criticality | The importance of the function to the system |
| DB Size | Small / Medium / Large (as defined in AlNRepositoryMaxDB_7_5.doc) |
| Class Name/s | com.sap.dbtests.xxx.JavaClassName |
| No. Statement Executions | Warm-Up Phase: | Execution Phase: |
| SQL Statement Text | SQL TEXT |
| Backup Name | MaxDB: BackupVolumeName | PTIME: BackupVolumeName |
| Other | Why this test was important, etc. |

FIG. 8A

| DB | | | | | Results | | | | | | | |
|---|---|---|---|---|---|---|---|---|---|---|---|---|
| | MaxDB | | | | | | P'TIME | | | | | |
| Run \ Metric | Avg [ms] | Total [ms] | Min [ms] | Max [ms] | Elapsed [ms] | Thput [tps] | Avg [ms] | Total [ms] | Min [ms] | Max [ms] | Elapsed [ms] | Thput [tps] |
| 1st. Run | 0 | 0 | 0 | 0 | 0 | 0.000 | 0 | 0 | 0 | 0 | 0 | 0.000 |
| 2nd. Run | 0 | 0 | 0 | 0 | 0 | 0.000 | 0 | 0 | 0 | 0 | 0 | 0.000 |
| 3rd. Run | 0 | 0 | 0 | 0 | 0 | 0.000 | 0 | 0 | 0 | 0 | 0 | 0.000 |
| 4th. Run | 0 | 0 | 0 | 0 | 0 | 0.000 | 0 | 0 | 0 | 0 | 0 | 0.000 |
| 5th. Run | 0 | 0 | 0 | 0 | 0 | 0.000 | 0 | 0 | 0 | 0 | 0 | 0.000 |
| Mean (μ) | 0.00 | 0.00 | 0.00 | 0.00 | 0.00 | 0.000 | 0.00 | 0.00 | 0.00 | 0.00 | 0.00 | 0.000 |
| Mean (-MinMax) | 0.00 | 0.00 | 0.00 | 0.00 | 0.00 | 0.000 | 0.00 | 0.00 | 0.00 | 0.00 | 0.00 | 0.000 |
| Variance (v) | 0.00 | 0.00 | 0.00 | 0.00 | 0.00 | 0.000 | 0.00 | 0.00 | 0.00 | 0.00 | 0.00 | 0.000 |
| SD (σ) | 0.00 | 0.00 | 0.00 | 0.00 | 0.00 | 0.000 | 0.00 | 0.00 | 0.00 | 0.00 | 0.00 | 0.000 |
| Other | | | | | | | | | | | | |

SYSTEMS AND METHODS FOR REPEATABLE DATABASE PERFORMANCE TESTING

BACKGROUND

The present invention relates to database testing, and in particular, to systems and methods for repeatable database performance testing.

Methodic software development should include repetitive performance evaluation and optimization of fundamental system components to lead to high-quality software products. In this context, the performance evaluation of database applications (e.g., relational database applications) is of special importance since sub-optimal database structures and access or update statements can result in severe performance problems. For efficient database performance evaluation, tools are needed that allow the flexible definition of repeatable performance experiments at both the individual access statement level (individual database transaction statements such as SQL statements, micro benchmark) and on the benchmark level (entire query mix/sequence of statements of a database application program). In addition, it would be beneficial if the tool provided a detailed and clear presentation of the performance properties of the respective test, and should support the documentation of individual test cases.

Although a multitude of software test tools (e.g., CASE tools) exist, none of the existing tools provide a low-footprint and easy to use solution for the definition, execution, and/or documentation of database performance experiments. Furthermore, none of the existing system test tools provide a comprehensive and simple database testing methodology comprising all steps from test case identification and execution to test result evaluation and documentation. Rather, existing test tools are designed to support a broad spectrum of test classes, and thus impose a more significant burden on the system under test (SUT) and are typically difficult to use.

Thus, there is a need for improved database testing systems and methods. The present invention solves these and other problems by providing systems and methods for repeatable database performance testing.

SUMMARY

Embodiments of the present invention improve database performance testing. In one embodiment the present invention includes a computer system including software for executing a method of testing the performance of an application running transactions against a database, the method comprising specifying one or more database transaction statements corresponding to at least one database table, wherein the specified database transaction statements are selected from one or more of the most computationally intensive statements in said application against said at least one database table, configuring the database in a predetermined initial state, separately executing each database transaction statements against the at least one database table a predetermined number of times, measuring the performance of the executed statements against the at least one database table, and in accordance therewith, generating performance results; and storing the performance results for access by a user.

In one embodiment, the database transaction statements are embedded in a test program and the test program instantiates a separate object corresponding to one or more transaction statements, and wherein separate objects further correspond to one or more tables.

In one embodiment, the performance results include a response time or throughput for each of the one or more database transaction statements.

In one embodiment, the database transaction statements are SQL statements.

In one embodiment, the method further comprises displaying the performance results to a user.

In one embodiment, the method further comprises generating statistical parameters from the performance results.

In one embodiment, the statistical parameters are mean, regular mean, variance, and standard deviation.

In one embodiment, measuring includes monitoring an elapsed time between a starting point and an end point of each executed database transaction statement.

In one embodiment, the method further comprises recording an elapsed time of each transaction in one of a plurality of duration bins, and in accordance therewith, generating a histogram.

In another embodiment, the present invention includes a method of testing the performance of an application running transactions against a database comprising specifying performance critical database transaction statements in the application corresponding to one or more tables and separately executing each performance critical database transaction statement against the database a predetermined number of times, wherein the database is in a predetermined initial state at the beginning of each execution cycle.

In one embodiment, the method further comprises identifying a plurality of database transaction statements as being computationally intensive in said application, classifying the database transaction statements in accordance with an operation type and a target table, and selecting the performance critical database transaction statements from one or more of the most computationally intensive database transaction statements in each class.

In another embodiment, the present invention includes a computer-readable medium containing instructions for controlling a computer system to perform a method of testing the performance of an application running transactions against a database comprising specifying database transaction statements in the application corresponding to one or more tables, wherein the specified database transaction statements are selected from one or more of the most computationally intensive statements in said application against said at least one database table, separately executing each database transaction statement against at least one database table a predetermined number of times, wherein the database is in a predetermined initial state at the beginning of each execution cycle, and measuring the performance of each executed database transaction statement.

In one embodiment, the method further comprises identifying a plurality of database transaction statements as being computationally intensive in said application, classifying the database transaction statements in accordance with an operation type and a target table.

In one embodiment, the database transaction statements are embedded in a test program and the test program instantiates a separate object for each transaction statement type, and wherein separate objects correspond to one or more tables.

In one embodiment, measuring includes monitoring an elapsed time between a starting point and an end point of each executed database transaction statement, and wherein time information is registered in internal variables of a program.

The following detailed description and accompanying drawings provide a better understanding of the nature and advantages of the present invention.

DETAILED DESCRIPTION

Described herein are techniques for testing database performance. The following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include obvious modifications and equivalents of the features and concepts described herein.

Embodiments of the present invention include systems and methods for database performance testing. In one embodiment, the present invention includes methods for easy definition and documentation of repeatable statement and benchmark level performance experiments. In another embodiment, the present invention includes a database performance evaluation tool that may be implemented in software (i.e., a test program). As described in more detail below, an example implementation of the test program may be in Java. A JDBC database access API may be used for the evaluation of Java applications that use JDBC to access a (relational) database. It is to be understood that other embodiments of the present invention may be implemented in other programming languages that interface with databases in other ways. For example, in one embodiment the software tool may be based on C/C++ and use ODBC for the evaluation of C/C++ based database applications.

Figure 1:
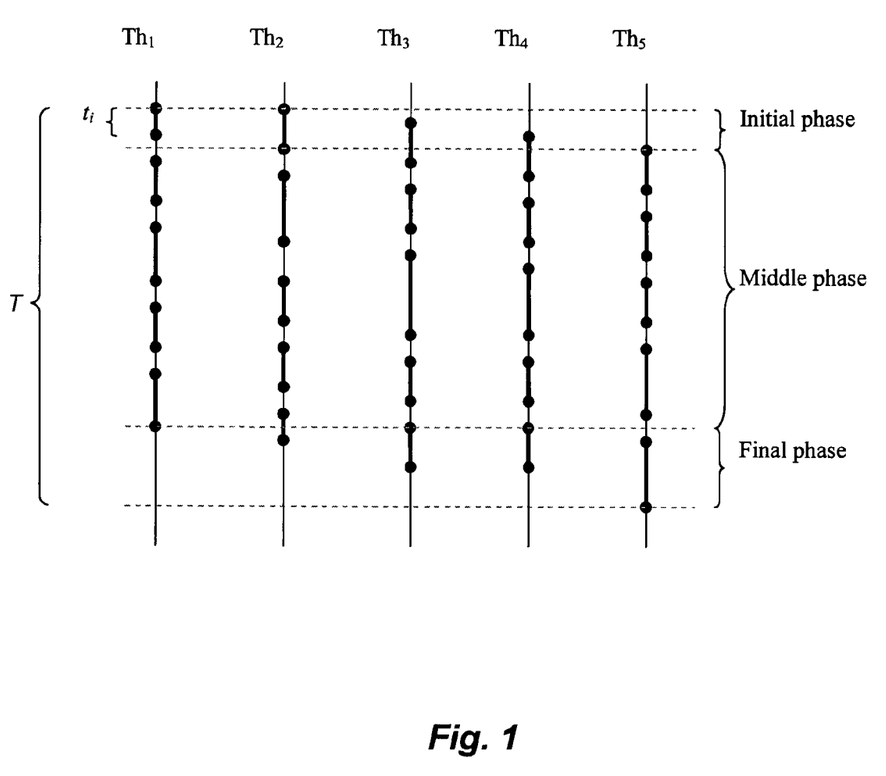
FIG. 1 illustrates a multithreaded transaction sequence.

FIG. 1 illustrates a multithreaded transaction sequence useful in understand certain performance measurements that may be obtained using example embodiments of the present invention. In the runtime diagram of FIG. 1, several threads $Th_1$ through $Th_5$ are shown. Each thread includes a fixed number of sequential transactions. Since extra work might be done between each transaction (i.e., looping and random statement input data generation), a central timer may be used to monitor the time elapsed between the start point and end point of each transaction (a.k.a. hit). FIG. 1 illustrates how several attributes can be measured (units shown in square brackets):

Total number of transactions, N [transactions]
Duration (or execution time) of a particular transaction, $t_i$ [sec]
Sum of the duration of all transactions, $$\sum_{i=0}^{N} t_i \text{ [sec]}$$

First and Last access timestamps
Total elapsed time (time elapsed between the beginning of the first transaction and the end of the last transaction), T [sec]
Average, Shortest and Longest transaction duration, [sec]
Throughput, calculated as $$Tp = \frac{N}{T} \text{ [transactions/sec]}$$

As can be seen from the runtime diagram in FIG. 1, during the Initial and Final phases not all the threads are executing concurrently (or pseudo-concurrently if multi-processor hardware is not used). This fact may affect the calculation of the throughput. However, the importance of such effect is often minimal even for short observation intervals. Indeed, an effective way to make the Middle phase significantly long is to use large values of N.

Figure 2:
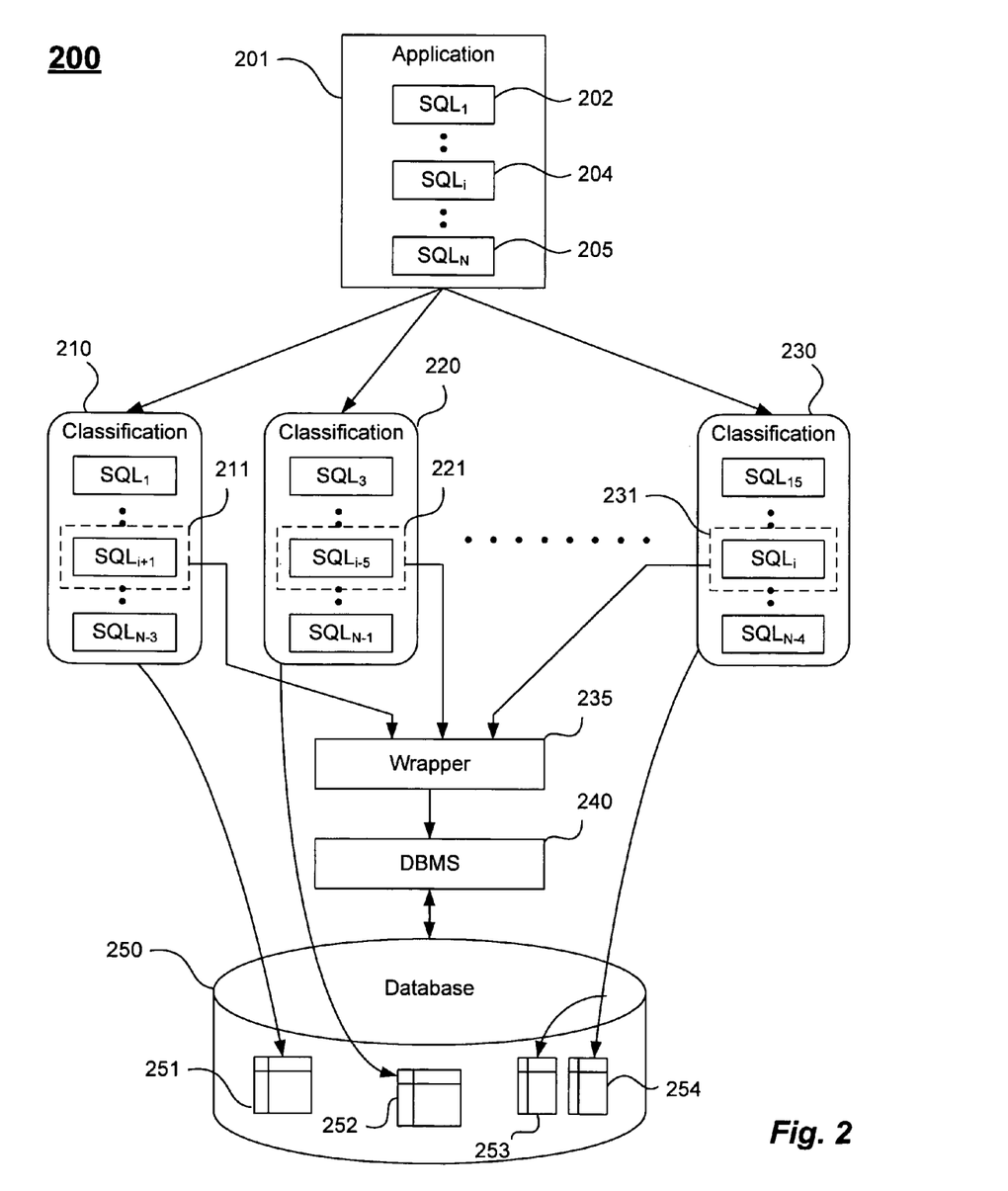
FIG. 2 illustrates testing the performance of an application running transactions against a database according to one embodiment of the present invention.

FIG. 2 illustrates testing the performance of an application running transactions against a database according to one embodiment of the present invention. The approach illustrated in FIG. 2 may be used to obtain some or all of the information illustrated in FIG. 1, and such information may be used to optimize the execution of the application against a database. An application 201 may be developed to run transactions against a database 250, for example. Application 210 may include many database transaction statements that perform operations on database 250. For example, one common language used for database transaction statements is a structured query language ("SQL"). Thus, application 210 may include many SQL statements, such as a first SQL statement $SQL_1$ 202, an $i^{th}$ SQL statement $SQL_i$ 204, and an $N^{th}$ SQL statement 205 (where N and i are integers; 1<=i<=N). Each statement may correspond to one or more tables in database 250. For example, a SELECT statement may include arguments that operate on only one table or on multiple tables in database 250. Thus, each statement in application 210 may be classified according to the statement's corresponding tables (i.e., the statement's target tables). Additionally, since different statements perform different types of operations (e.g., SELECT, INSERT, UPDATE), the statements may further be classified according to operation type.

Statement classifications according to operation type and/or target table are shown at 210, 220, and 230. Any number of such classifications may exist, and each classification may have one or multiple transaction statements associated with the class. Class 210 may include many SQL statements that correspond to table 251 in database 250, including the first SQL statement 202, an $i+1^{st}$ SQL statement, and an $N-3^{rd}$ SQL statement. Similarly, classification 220 may include statements that correspond to table 252, and classification 230 may include statements that correspond to two tables 253 and 254.

The statements in each class may include all the statements from application 210 that correspond to each respective table or tables, or the classes may only include statements that have been identified as being computationally intensive in said application. For example, application 210 may be analyzed, and the database transaction statements that dominate execution time may be identified. Such transactions, by virtue of their location in the application or role in an algorithm, are the transactions that are the most computationally intensive statements in said application against their respective database table(s). Computationally intensive statements are statements that are time consuming to execute individually or statements that are executed frequently (e.g., in a loop), and therefore significantly influence application performance. Statements that are not computationally intensive may be excluded from classification because such statements are deemed to have only a minor affect on overall application performance. Such exclusion may be helpful in reducing the total number of statements analyzed.

From the classes of statements, each class in turn will have one or more database transaction statements that are performance critical. Performance critical database transaction statements are selected from one or more of the most computationally intensive database transaction statements in each class. These statements have the highest execution cost in the application against their corresponding tables, and information about their performance may be crucial in optimizing the performance of the system. As shown in FIG. 2, the performance critical statement in class 210 against table 251 is the i+1$^{st}$ SQL statement 211. Similarly, the performance critical statement in class 220 against table 252 is the i+5$^{th}$ SQL statement 221. Likewise, the performance critical statement in class 230 against tables 253-254 is the i$^{th}$ SQL statement 231. Of course, multiple statements in each classification may be identified as performance critical depending on the nature of the application and the desired performance. For example, multiple statements relating to one transaction against a table or tables may be identified as a performance critical statement group.

In one embodiment, the present invention includes a method of testing the performance of an application running transactions against a database comprising specifying performance critical database transaction statements in the application corresponding to one or more tables and separately executing each performance critical database transaction statement against the database a predetermined number of times, wherein the database is in a predetermined initial state at the beginning of each execution cycle. Example techniques for configuring the database in a predetermined initial state are described in more detail below. In one example embodiment, each performance critical statement is included in a wrapper 235, which may be part of a test program, and the wrapper executes the database transaction statement multiple times against the corresponding database table or tables via a database management system ("DBMS") 240. The system may then reset the database into a predetermined initial state and repeat the execution cycle as many as five (5) or more times. Performance result data at the extreme ends of the five cycles may be eliminated to improve statistical accuracy of the tests. As shown in the examples below, the wrapper may include software components for monitoring an elapsed time between a starting point and an end point of each executed database transaction statement. Additionally, in some embodiments time information may be registered in internal variables of the test program.

Figure 3:
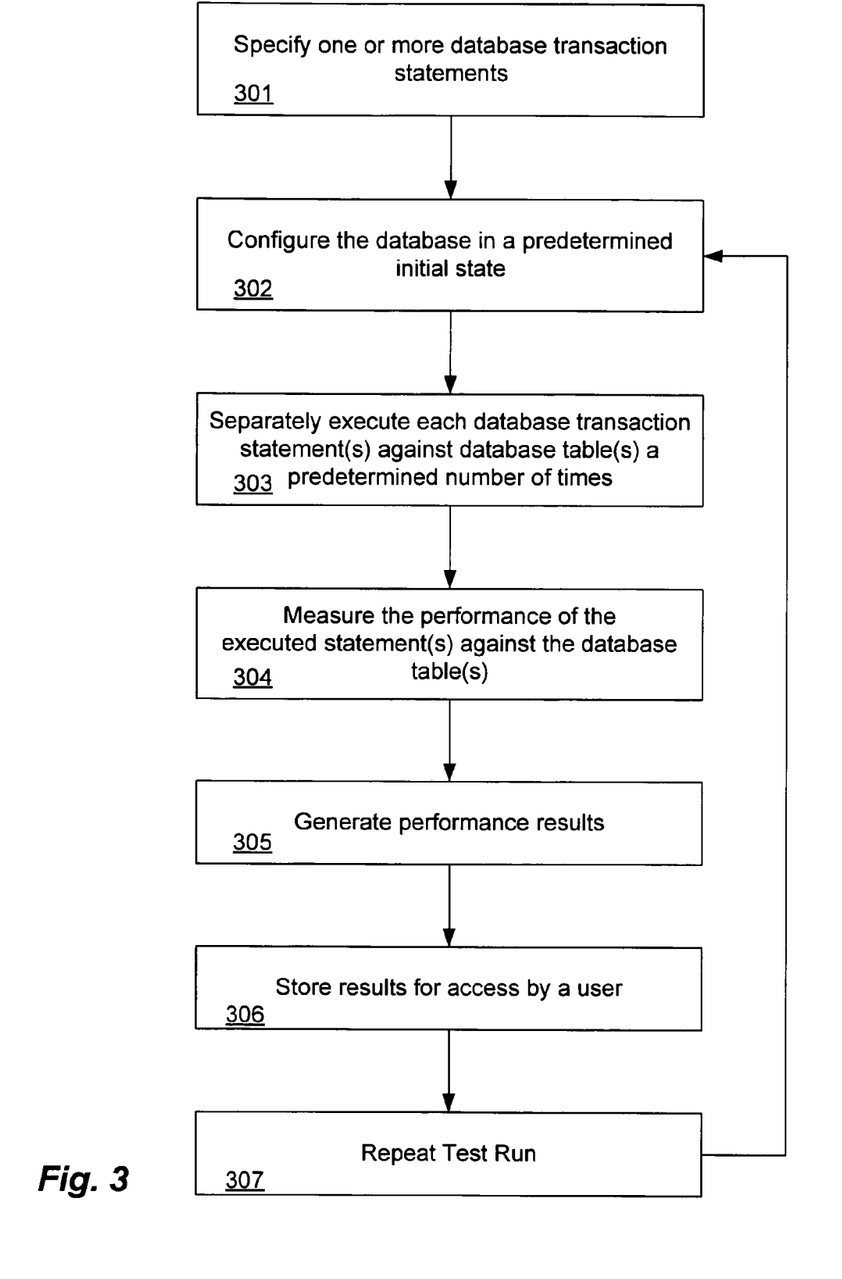
FIG. 3 illustrates a method of performance testing according to one embodiment of the present invention.

FIG. 3 illustrates a method of performance testing according to one embodiment of the present invention. At 301, one or more database transaction statements are specified. The specified database transaction statements may correspond to at least one database table. The specified database transaction statements may further be selected from the most computationally intensive statements in an application that operate against the corresponding table in the database. At 302, the database is configured in a predetermined state. In many testing environments, it is desirable to repeat the test multiple times to understand how performance may change over time. Execution of one or more embedded statements may occur as many as 10,000 times or more, which is referred to as a test run. By configuring the database in a predetermined state prior to each test run, the test run will be conducted under approximately the same conditions. The predetermined state may be a database state that can be recovered when desired. In one embodiment, a backup of the database having some particular environment state is maintained as the control environment for testing purposes. At 303, each database transaction statement is separately executed against its corresponding tables a predetermined number of times. For example, different executions of experiments may return different results (distributions). Different results may occur from caches that may get filled up or steps that have been saved and reused by the database. For instance, the first time a database is run, it may build up an execution plan and store the plan in a statement cache. On subsequent runs, it does not have to optimize the statement again, but will use the execution plan it optimized on the earlier run. A variety of such factors may cause the results to vary from execution to execution.

At 304, the performance of the executed statement or statements against the database table(s) is measured and performance results are generated at 305. These results may include a variety of performance measurements. For example, in one embodiment the performance results include a response time for each of the one or more database transaction statements. Response time is associated with the question, "How long does it take to execute a given database statement?"—e.g., "how long does it take to respond to a specific data request?" Response time refers to an elapsed time interval during which the response to a request must be executed. The time interval defines a response window given by a starting time and an ending time. These can either be specified as absolute times (time of day, for example) or offsets from a request which occurred at some specified time. In another embodiment, the performance results include a throughput for each of the one or more database transaction statements. Throughput is associated with the question "How many times can a given statement be executed over a given interval of time?—e.g., "how many data requests can be responded to over a given interval of time?" Throughput refers to the number of request responses that have been completed over a given observation interval. In some implementations it may not be sufficient to just specify a processing rate. One or more observation intervals may also need to be specified. For example, a system that can process 120 database transactions every hour might not guarantee that 2 transactions will be processed every minute. It is possible that such a system processed no transactions during the first 30 minutes and all of the transactions were processed during the remaining 30 minutes. It is to be understood that a variety of other database performance metrics could also be obtained using the techniques described herein. After the system has generated the desire results, the results may be stored for access by a user at 306. At 307, additional test runs may be performed, in which case the process returns to 302. Accordingly, during each test run, each experiment may be executed a predetermined number of times. After the statement is executed a desired number of times, the backup version of the database may be recalled and used as the predetermined initial state for next test run. Running multiple test runs helps to rule out variations that may be caused by operating system maintenance (executed by background operating system processes) or other interference caused by programs or processes running in the background, for example. Additionally, embodiments of the present invention may throw away extreme test run data points. For example, in one embodiment five (5) or more test runs are performed, and the best and worst test results are eliminated so that a more accurate statistical mean is obtained.

In one embodiment, the present invention may further display the performance results to a user. The results may be transferred to any of a variety of reporting tools (e.g., Excel) for presentation and display. In yet other embodiments, statistical parameters may be generated from the performance results. For example, if the results are throughput or response time values for successive runs, the mean, regular mean, variance, and standard deviation of the values may be calculated and presented to a user for analysis. The regular mean is defined as the mean for all values excluding extremes (i.e., outlying values at either end of the distribution).

Figure 4:
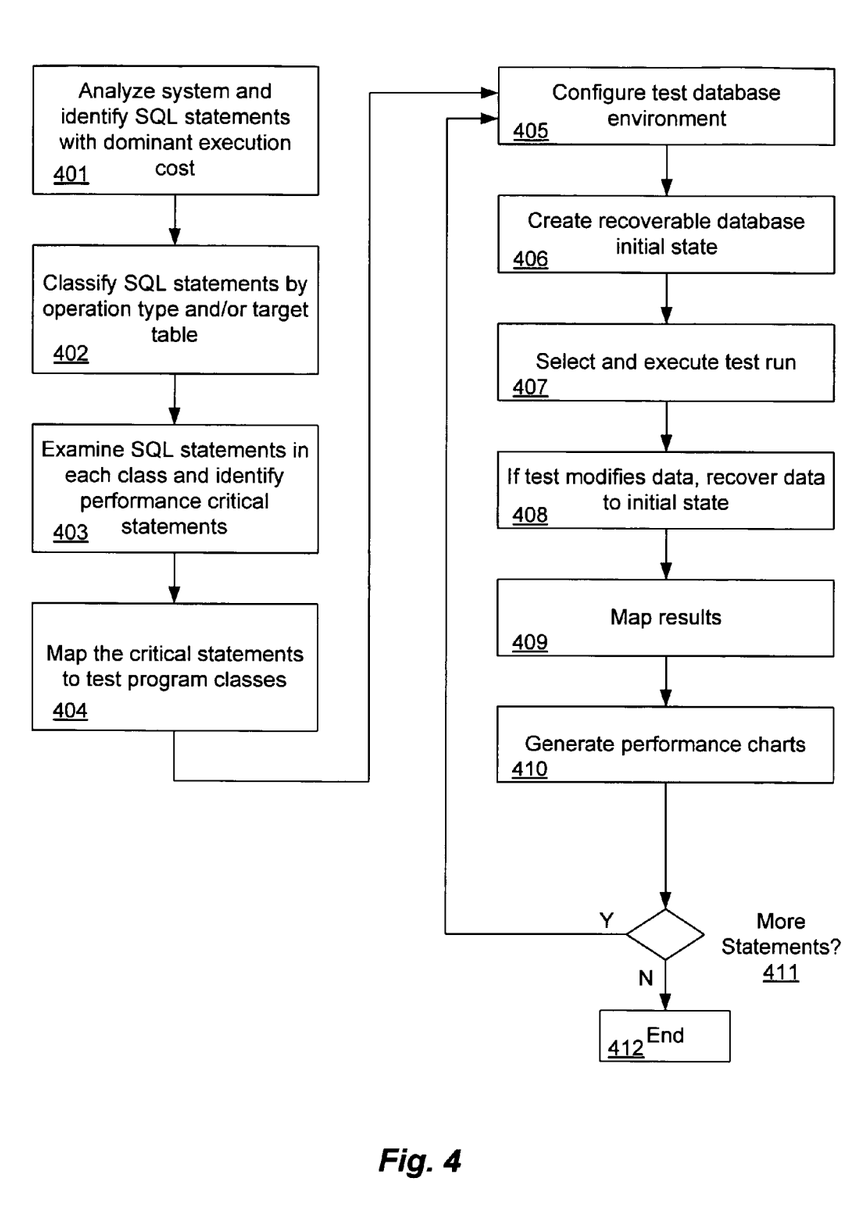
FIG. 4 illustrates a method of performance testing according to another embodiment of the present invention.

FIG. 4 illustrates a method of performance testing according to another embodiment of the present invention. At 401, the software system is analyzed and SQL statements, for example, that are computationally intensive are identified in the application. At 402, the SQL statements are classified by operation type and/or target table. At 403, the SQL statements in each classification are examined, and one or more performance critical statements are identified in each class. At 404, the critical statements are mapped to test program software classes. Software classes are one example of part of the wrapper for execution of the statements. In one example embodiment described in more detail below, a Java class for each statement may be constructed (i.e., a wrapper or container that is used to execute each statement and get a response time). The statement in the class container may be used by other classes to execute the statement. For example, the statement may be a SQL statement string (unless it's embedded SQL). The SQL statement may be sent to the database and the result received. Embodiments of the invention may isolate the string from the application code, embed the string into a class container, and execute the experiment. Other software classes may be used to control execution of the statement a certain number of times, monitor and measure execution performance and timing parameters, and present the results, for example. At 405, the test database environment is configured. This may include designing a test database environment or copying an existing database for use as the target test database. For example, in order to obtain realistic test results, the database should contain realistic data in terms of amount of data and the values and/or range of values of the data. For instance, if a statement orders or groups data, it would be advantageous to have a typical distribution of values as a real-world application. Generating this data may be done by design for a new database application. Alternatively, where the database application (or a similar application) is already deployed, the deployed system may be copied and used as a test database.

At 406, a recoverable database initial state is created so that each test run operates under approximately the same conditions. As mentioned above, a copy of a database may be preserved and reinstated at the beginning of each test run, and thereby provide the predetermined initial state. At 407, a statement is selected for testing and the test executed. The test for each statement may be carried out any number of times to acquire the desired distribution of performance data. In one embodiment, execution may include specifying how often statements should be executed (e.g., a SELECT statement: 1000 times, 10 k times, etc . . . ). The more times a statement is executed, the closer the average time will be "statistically" to the real MEAN. It is typically desirable to execute more cycles of each statement. However, some statements (e.g., a GROUP statement) are very time consuming. Thus, there is a tradeoff between accuracy (number of executions) and execution time. At 408, if the test modifies data in the database during a test run, then the data is recovered to an initial state on the next test run. In one embodiment, the entire database and DBMS may be reset before each subsequent test run. At 409, the results generated from the test are mapped to a results form (e.g., a report that may be displayed to a user). At 410, performance charts may be generated. For example, statistical parameters may be generated and the data presented as a histogram or other form of chart. At 411, if more statements are to be tested, the process returns to 405. If no additional statements are to be tested, the process ends at 412.

While steps 401-404 may be carried out manually by a skilled program analyst during the design and development of an application, it is to be understood that these steps could also occur automatically under the control of a computer program. For example, a program may automatically identify SQL statements in an application by source code analysis. Further, the program may classify the statements according to statement type and corresponding table by analyzing the actual statement text, for example. Additionally, selection of the most computationally intensive statements may be made automatically by running the program to determine the most computationally intensive statements in each class. The program may automatically search for frequently used statements by searching for statements nested in loops, for example, and analyzing the loop parameters. In a real-world application, an application designer may wish to review the results of the automated process to verify the optimization.

Figure 5:
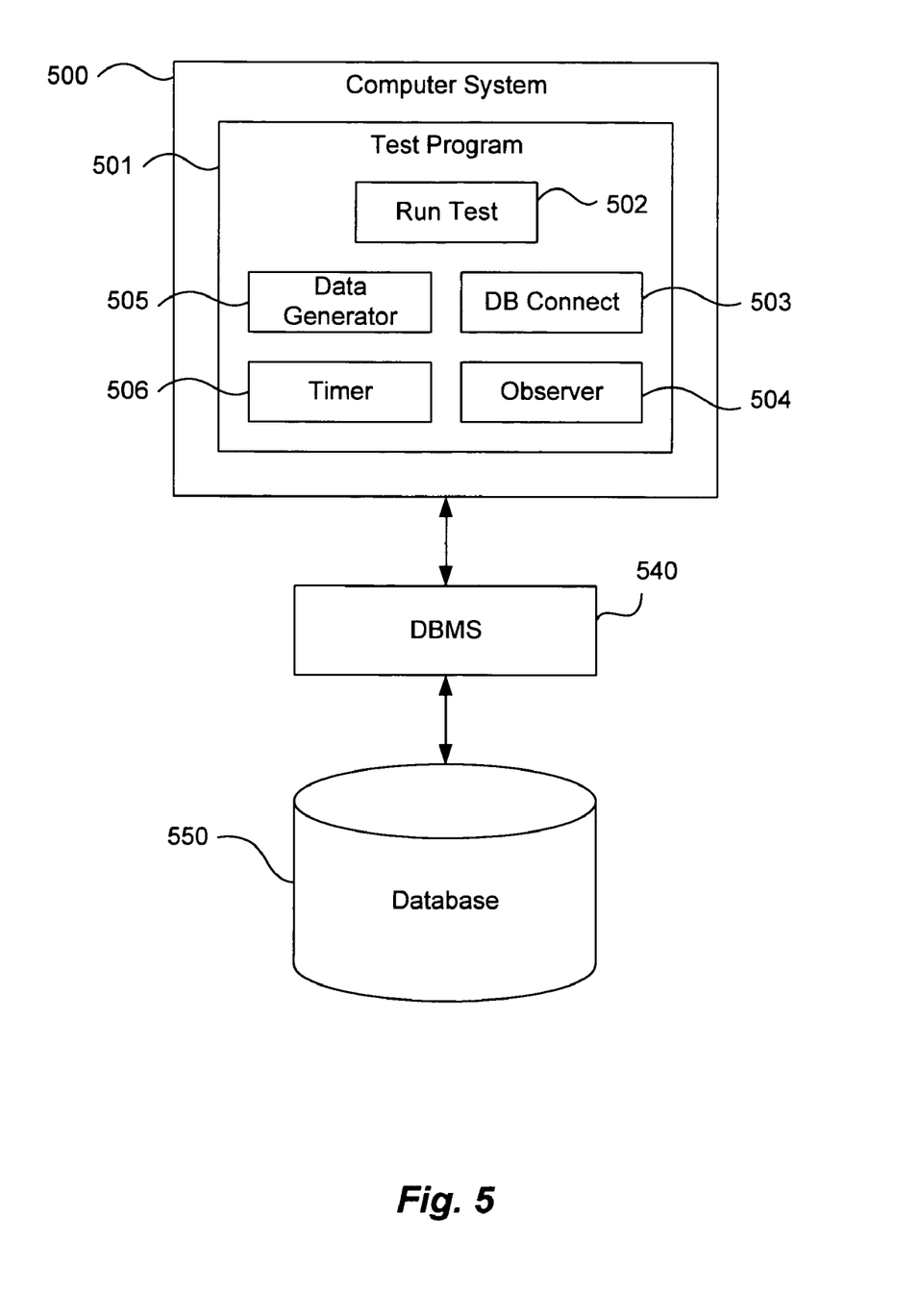
FIG. 5 illustrates a test program according to another embodiment of the present invention.
Figure 7:
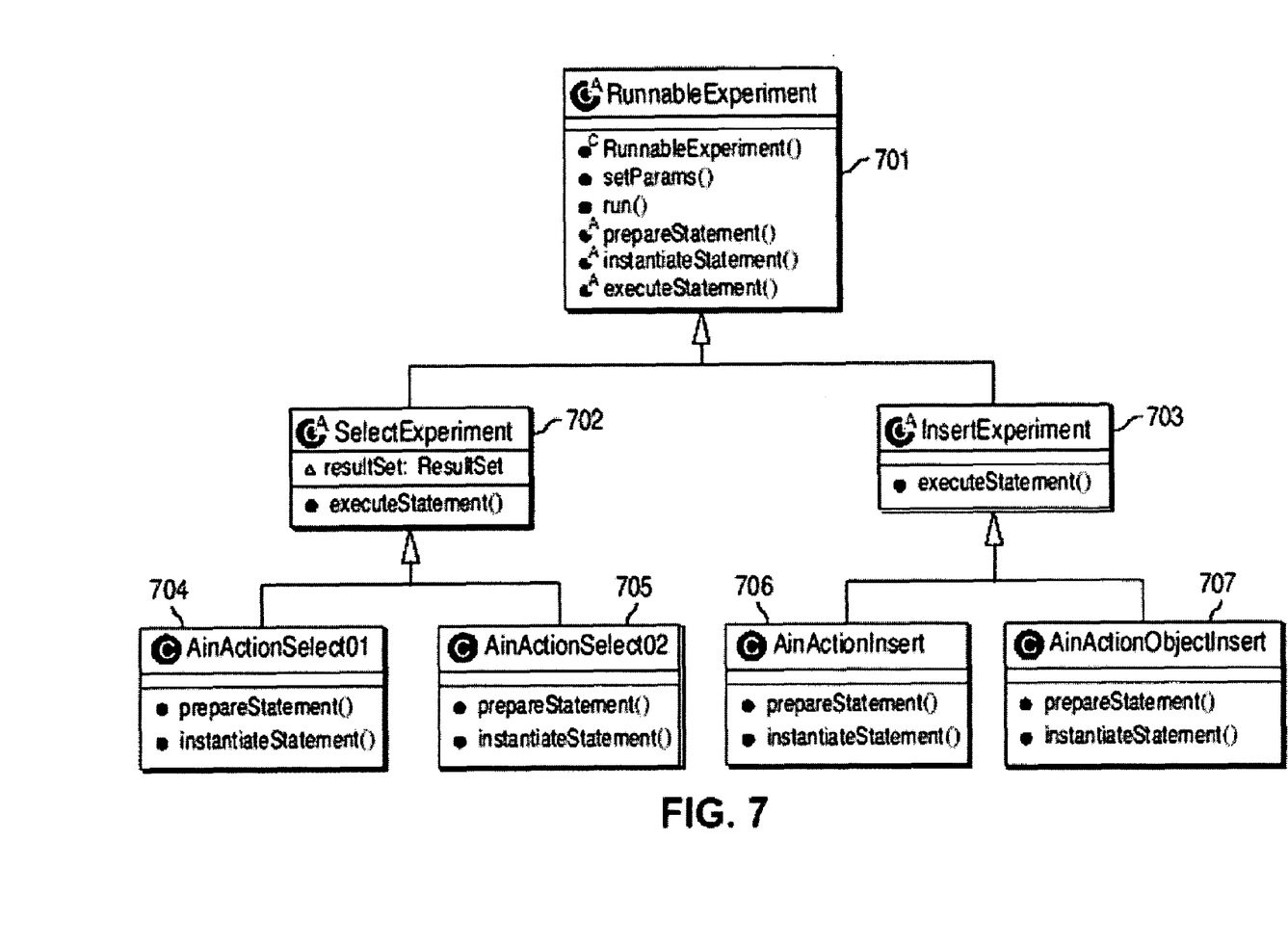
FIG. 7 is an example of a class hierarchy for embedded SQL statements in a test program according to another embodiment of the present invention.

FIG. 5 illustrates a computer system 500 including software for executing a method according to another embodiment of the present invention. Test program 501 may include software tools for database performance evaluation. Test program 501 may include a main Run Test component 502, DB connect component 503, Observer component 504, Data Generator 505, and Timer 506. Run Test component 502 may be used to control the execution of database transaction statements against the database. A class hierarchy for an example Run Test component is shown in FIG. 7. DB connect component 503 may be used to establish connectivity to database 550 via database management system ("DBMS") 540. Observer component 504 may be used to monitor the status of different processes, such as the status of threads and corresponding database transactions, for example. Data generator component 505 may be used to generate the data used in testing the databases. As mentioned above, other embodiments may use a copy of a preloaded deployed database rather than a data generation component. Timer component 506 may be used to monitor elapsed time between a starting point and an end point of each executed database transaction statement or the total time to complete all transactions. In one embodiment, time information is registered in internal variables of the test program.

EXAMPLE

Figure 6:
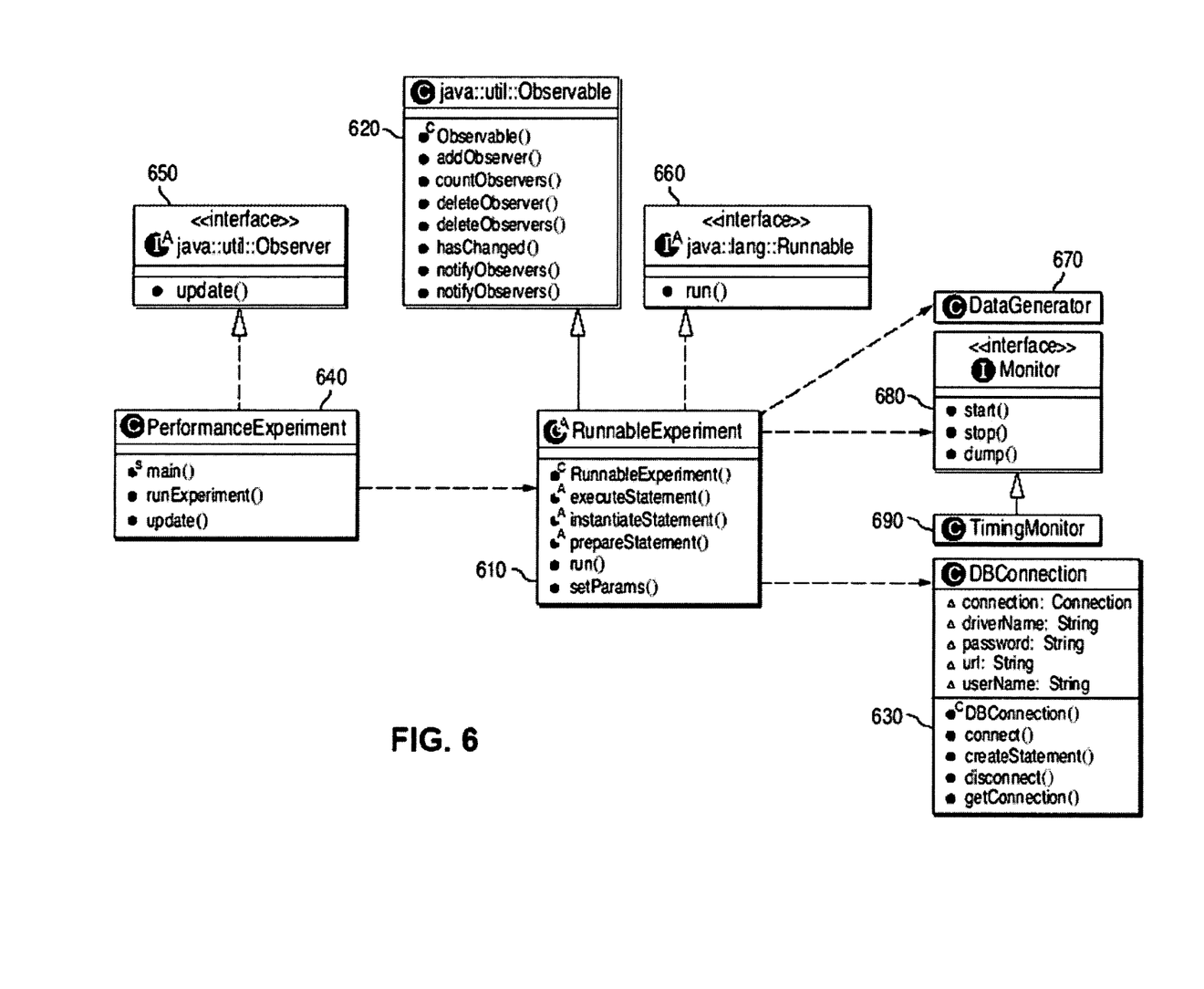
FIG. 6 is an example of test program classes according to another embodiment of the present invention.

FIG. 6 is an example of test program classes according to another embodiment of the present invention. In one embodiment, the present invention includes a very low footprint test tool that is easy to extend and use. The test methodology of the present invention can be used for database performance tests on a variety of hardware platforms. If implemented in Java as described in the examples below, the methods may be used on any platforms that support the Java programming language. The focus of the example methodology that follows is on database response times and database throughput tests (the two most useful and most common test classes for database performance testing). The test tool's functionality may be implemented in a modular fashion as shown in FIG. 6, with different responsibilities being assigned to each class. In FIG. 6, the main classes are depicted. The classes include a "RunnableExperiment" class 610, a "Observable" class 620, a "DB Connection" class 630, a "PerformanceExperiment" class 640, an "Observer" class 650, a "Runnable" class 660, a "DataGenerator" class 670, a "Monitor" class 680, and a "TimingMonitor" class 690. The framework is centered around an abstract "RunnableExperiment" class, which specifies the generic behavior of a performance experiment such as establishing a database connection or executing a warm-up stage and an experimentation stage. Subclasses of it represent more specific experiments like "InsertExperiment," "SelectExperiment," and "UpdateExperiment" associated to the respective SQL operations like INSERT, SELECT or UPDATE. A user may extend the latter with other specific experiments. The "RunnableExperiment" class is provided with the necessary helper objects such as a database connection, a random data generator, and a well-defined monitored, multi-threaded execution. At the end of the execution, the monitoring results are printed to standard output and to a results file for documentation.

The main class, PerformanceExperiment, drives the execution of the overall experiment. It receives and interprets several command-line options. According to these parameters, it creates the necessary helper objects, establishes the information for the DBConnection and creates a DataGenerator for the entire experiment. This class implements the Observer interface, allowing the experiment threads status to be monitored.

The RunnableExperiment is the base class for all the experiments. It implements the Runnable interface, which allows its code to be assigned to and executed in separate Java Threads. It is an Observable subclass as well, enabling these objects to communicate asynchronously with other Observer objects (this communication mechanism may be used to signal the end of the experiment thread execution). Each RunnableExperiment defines the abstract lifecycle of every experiment. The first step is the creation of its own DBConnection, followed by a warm-up phase, and finally the execution of the experiment itself. Subclasses of this class define how these steps must be performed individually. The DataGenerator class is a helper tool used to generate the necessary random or sequential data used in the data requests (e.g., SQL statements) for the associated tables. The DBConnection class establishes and releases a connection to the underlying JDBC data source, i.e., wraps the instance members required to settle and hold a connection to a JDBC database. The Monitor interface defines the methods that a RunnableExperiment expects from a monitor. Particularly the TimingMonitor class implements this interface by registering the time information in internal variables, as well as recording the duration of each transaction in one of several duration bins (or buckets), which are afterwards used to generate a histogram of the experiment.

FIG. 7 is an example of a class hierarchy for embedded SQL statements in a test program according to another embodiment of the present invention. As previously mentioned, the database transaction statements are embedded in a test program (e.g. as classes) and the test program instantiates a separate object corresponding to one or more transaction statements. The separate objects further correspond to one or more tables. For example, there may be one object per test case, and a test case may include one individual database statement or a sequence of related database statements that form one database transaction or multiple related database transactions. For example, as mentioned above the RunnableExperiment class 701 is the base class for all the experiments. The class hierarchy is structured in two levels: the first level contains experiment-generic classes (like SelectExperiment 702 or InsertExperiment 703), while the second level contains experiment-specific classes (like AinActionSelect01 704, AinActionSelect02 705, AinActionInsert 706, or AinActionObjectInsert 707). Note that the naming convention for the experiment-specific classes in FIG. 7 is <tablename><statement name>. Thus, the AinActionInsert class 706 is for "INSERT" statements against the "AIN_ACTION" table, for example. The SelectExperiment class 702 represents the base class for all the SQL SELECT experiments. Since the associated SQL statement will generate a result, all its instances contain a ResultSet member variable. The AinActionSelect01 class 704 encapsulates the information to prepare the SQL statement and issue it against the AIN_ACTION table, for example. Similarly, the InsertExperiment class 703 represents the base class for all the SQL INSERT experiments. The AinActionInsert class 706 encapsulates the information to prepare the SQL statement and issue it against the AIN_ACTION table. It is noteworthy that this set of classes provides a behavior similar to that of a typical application program running on top of the respective data source. In this multithreaded environment, consideration may be made to ensure thread-safe timers, such as carefully marking the methods of the TimingMonitor as synchronized.

Figure 8A:
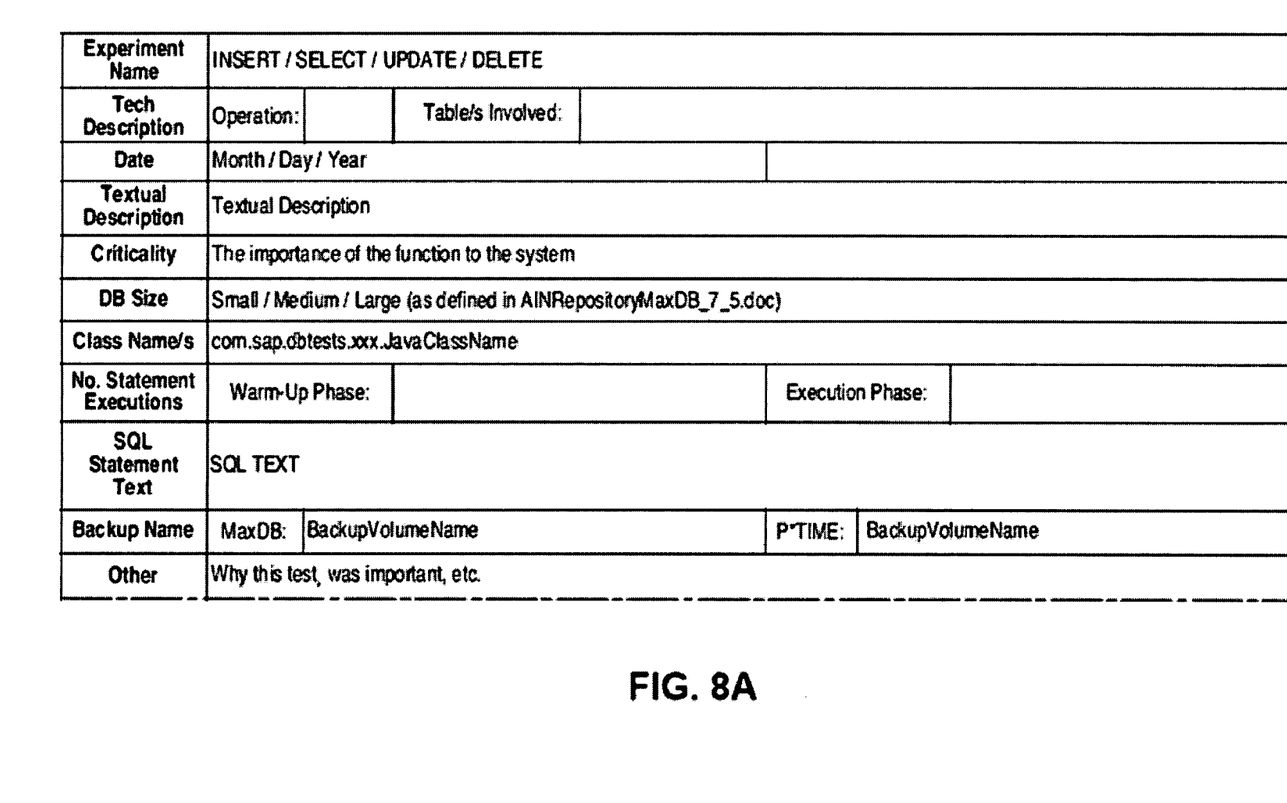
FIGS. 8A-B are examples of the performance results generated according to another embodiment of the present invention.
Figure 8B:
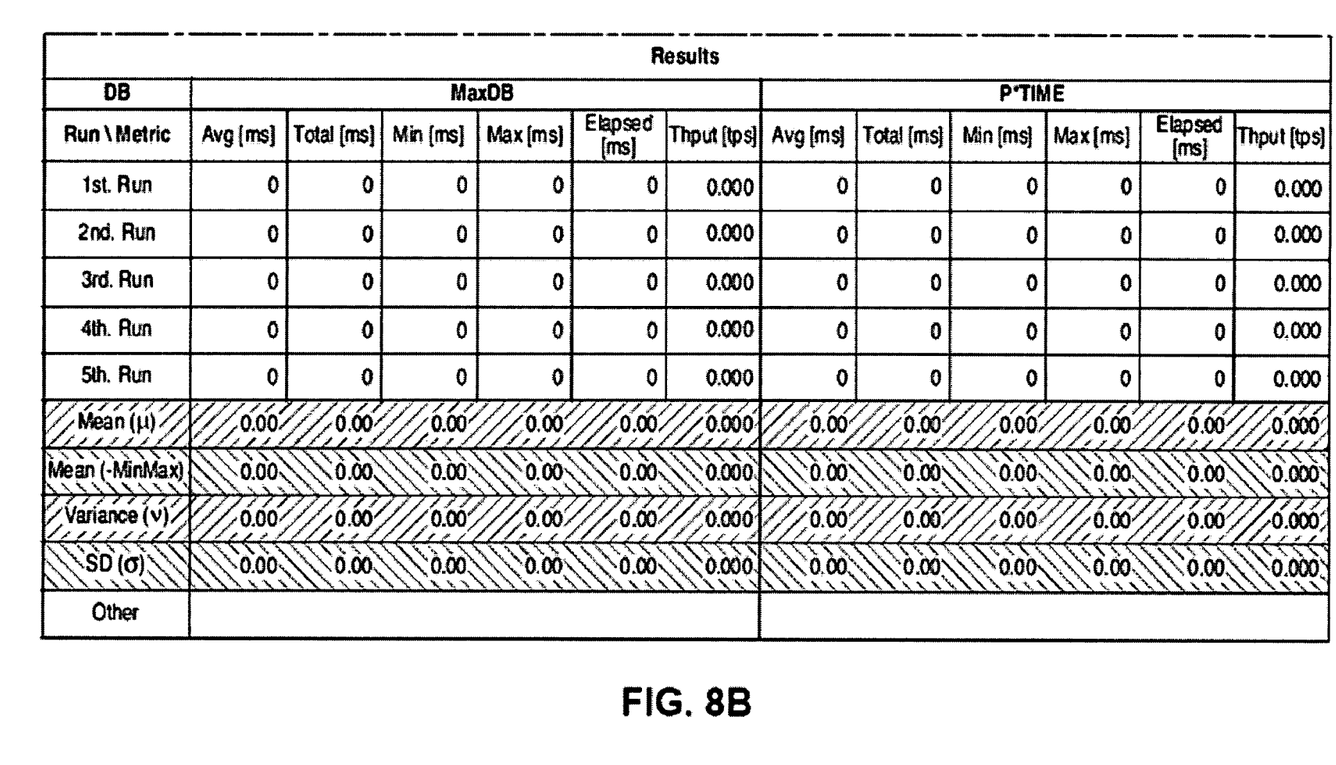
Figure 9:
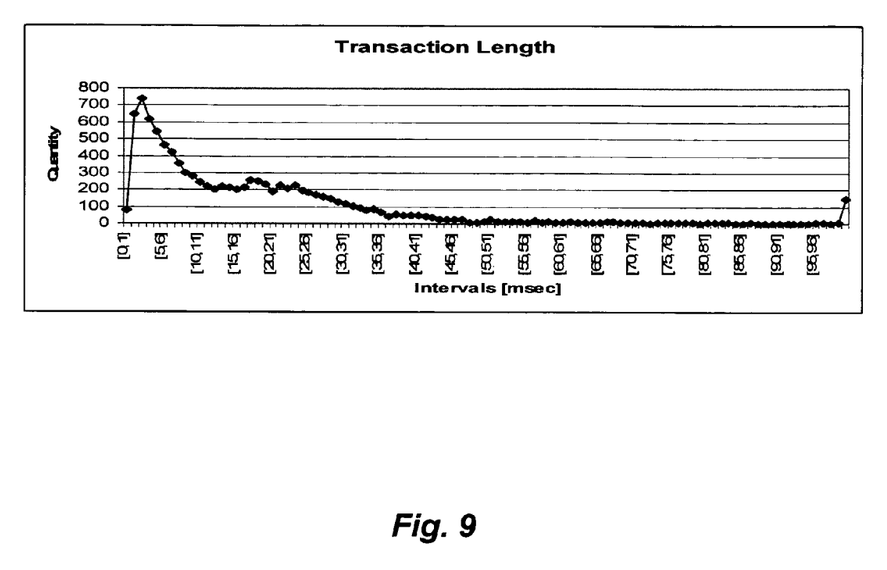
FIG. 9 is an example of a statement execution time histogram according to another embodiment of the present invention.

FIGS. 8A-B are examples of the performance results generated according to another embodiment of the present invention. Once an experiment is run, summary result data will be sent to an output such as a data file. In order to provide standardized reports, this data can be mapped into a uniform table that lists response time and throughput. This template is shown in FIG. 8A and FIG. 8B. In addition to the previously described attributes, mean, regular mean, variance, and standard deviation may be automatically calculated as shown. These reports might be accompanied by an associated histogram as shown in FIG. 9 whenever additional information can be inferred from the data. Hence the previously described timing monitor is also used to register the duration of transactions. Instead of keeping track of each transaction's length, duration bins (i.e., buckets) are used. Each bucket represents a fixed time segment that transactions may take. After a transaction ends, it is mapped to the respective bucket and a counter is incremented. Later, a chart like the one shown in FIG. 9 can be generated. These charts are useful to learn about the transactions behavior, i.e., how many transactions took how long.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. For example, many of the processes described above may be done manually by a designer. However, embodiments of the present invention include a software tool that automatically implements some or all of the steps described above. Based on the above disclosure and the following claims, other arrangements, embodiments, implementations and equivalents will be evident to those skilled in the art and may be employed without departing from the spirit and scope of the invention as defined by the claims. The terms and expressions that have been employed here are used to describe the various embodiments and examples. These terms and expressions are not to be construed as excluding equivalents of the features shown and described, or portions thereof, it being recognized that various modifications are possible within the scope of the appended claims.

What is claimed is:

1. A computer system including software for executing a method of testing the performance of an application running transactions against a database, the method comprising:
    specifying one or more database transaction statements corresponding to the same database table, wherein the specified database transaction statements are selected from one or more statements in said application against said database table, wherein the selected statements include at least one database transaction statement having an execution time greater than all the other database transaction statements in said application;
    separately executing the at least one database transaction statement against the database table a predetermined plurality of times, wherein each execution comprises configuring the database in a predetermined initial state and measuring the performance of the executed statements against the at least one database table, and in accordance therewith, generating performance results; and
    storing the performance results for access by a user.

2. The computer system of claim 1 wherein the database transaction statements are embedded in a test program and the test program instantiates a separate object corresponding to one or more transaction statements, and wherein separate objects further correspond to one or more tables.

3. The computer system of claim 1 wherein the performance results include a response time or throughput for each of the one or more database transaction statements.

4. The computer system of claim 2 wherein the database transaction statements are SQL statements.

5. The computer system of claim 4 wherein the objects are instantiated from an INSERT class corresponding to an INSERT SQL statement, a SELECT class corresponding to a SELECT SQL statement, and an UPDATE class corresponding to an UPDATE SQL statement.

6. The computer system of claim 1 wherein the method further comprises establishing connectivity to a database using a database connect component.

7. The computer system of claim 1 wherein the method further comprises monitoring the status of database transactions during execution of the database transaction statements using an observer component.

8. The computer system of claim 1 wherein the method further comprises generating data used in testing the database using a data generator component.

9. The computer system of claim 1 wherein the method further comprises monitoring elapsed time between a starting point and an end point of each executed database transaction statement using a timer component.

10. A computer-readable medium containing instructions for controlling a computer system to perform a method of testing the performance of an application running transactions against a database comprising:
    specifying database transaction statements in the application, wherein each specified statement is executed against the same one or more database tables;
    selecting one of said specified database transaction statements, wherein the selected statement has an execution time against said one or more database tables that is greater than all the other database transaction statements executed against said one or more database tables in said application;
    separately executing the selected database transaction statement against said one or more database tables a predetermined plurality of times, wherein the database is in a predetermined initial state at the beginning of each execution cycle; and
    measuring the performance of each executed database transaction statement.

11. The computer-readable medium of claim 10 further comprising classifying the database transaction statements in accordance with an operation type and a target table.

12. The computer-readable medium of claim 10 wherein the database transaction statements are embedded in a test program and the test program instantiates a separate object corresponding to one or more transaction statements, and wherein separate objects further correspond to one or more tables.

13. The computer-readable medium of claim 10 wherein measuring includes monitoring an elapsed time between a starting point and an end point of each executed database transaction statement, and wherein time information is registered in internal variables of a program.

* * * * *